United States Patent [19]
Struble

[11] Patent Number: 6,079,286
[45] Date of Patent: Jun. 27, 2000

[54] UNIVERSAL TRANSDUCER

[76] Inventor: James E. Struble, 8610 Hawk Dr., Eaton Rapids, Mich. 48895

[21] Appl. No.: 09/178,982

[22] Filed: Oct. 26, 1998

Related U.S. Application Data

[60] Provisional application No. 60/063,514, Oct. 27, 1997.

[51] Int. Cl.[7] ............................................... G01B 5/28
[52] U.S. Cl. ............................................................ 73/866.5
[58] Field of Search .................................. 73/866.5, 105; 33/788, 789, 572, 559, 561; 324/447, 724, 690; 403/109.2, 109.3

[56] References Cited

U.S. PATENT DOCUMENTS

| 4,221,053 | 9/1980 | Bobel, II et al. |
|---|---|---|
| 4,731,935 | 3/1988 | Struble . |
| 4,776,212 | 10/1988 | Parsons et al. ............................ 73/105 |
| 4,869,119 | 9/1989 | Bachand et al. ........................ 73/866.5 |
| 5,607,173 | 3/1997 | Lai . |
| 5,797,696 | 8/1998 | Baynes et al. |

OTHER PUBLICATIONS

JS Catalogue 1.1, © 1996.

*Primary Examiner*—Robert Raevis
*Attorney, Agent, or Firm*—MacMillan, Sobanski & Todd, LLC

[57] ABSTRACT

A quick-change attachment mechanism for a measurement assembly. The attachment mechanism includes a female part and a male part. The female part includes a female body having a pin hole formed therein, and an engagement piece disposed in the female body and urged into the pin hole. The male part includes a male body having a connection pin attached thereto, the connection pin including a recess defining a ramped connection surface. The connection pin of the male part is adapted to be inserted into the pin hole of the female part, with the engagement piece of the female part engaging the ramped connection surface of the connection pin to attach the male part to the female part. The engagement piece may be a spring loaded ball detent device, for example, engaging a notch formed on the connection pin to releasably couple the male part and the female part. One of the male part and the female part may be attached to a measuring instrument, with the other of the male part and the female part attached to a measuring tip, thereby allowing the measuring tip to be releasably mounted on the measuring instrument. The invention also relates to measuring instruments which may be adapted to various measuring jobs by selectively mounting various measuring tips and support bases adapted to a chosen measuring job utilizing a quick-change attachment mechanism.

21 Claims, 14 Drawing Sheets

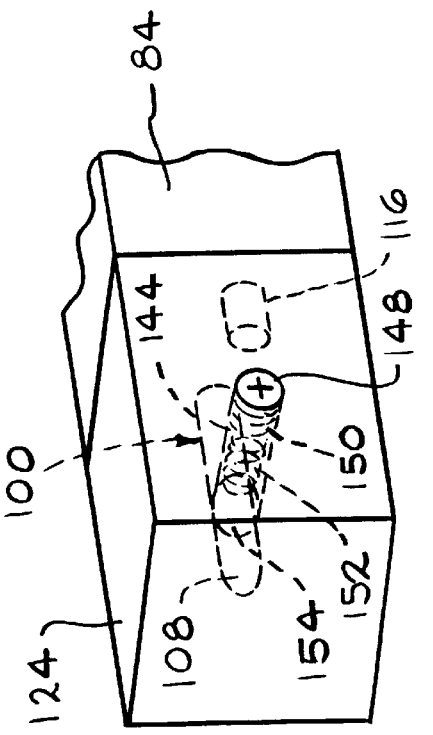
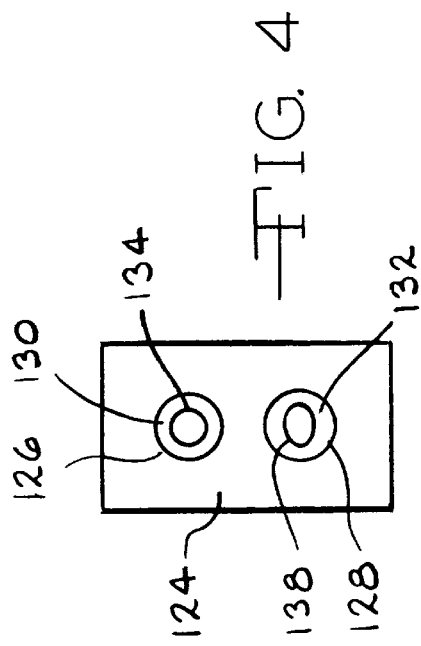
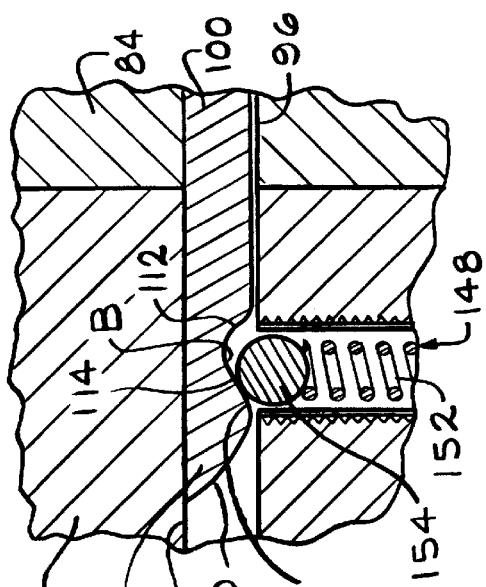

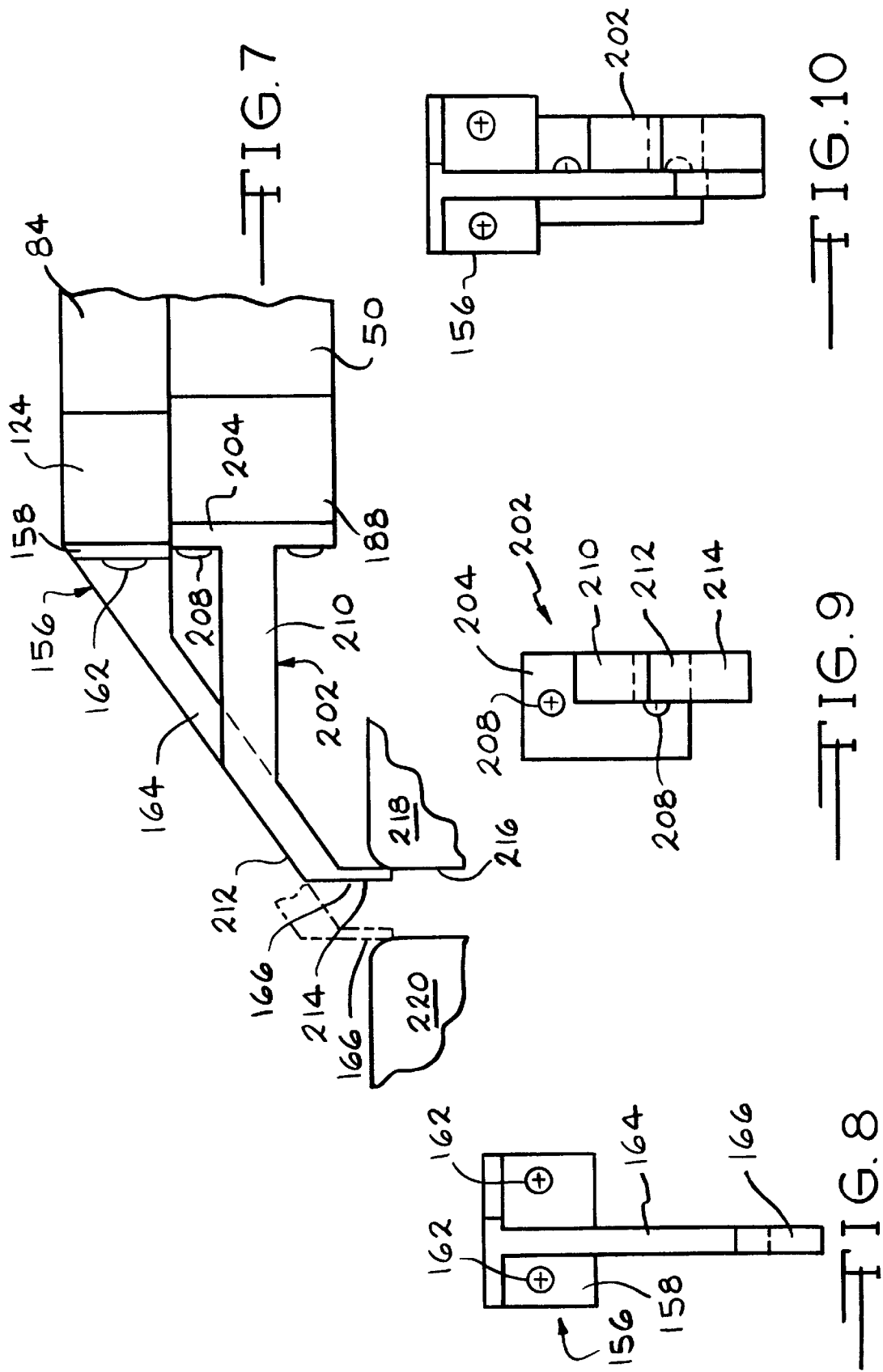

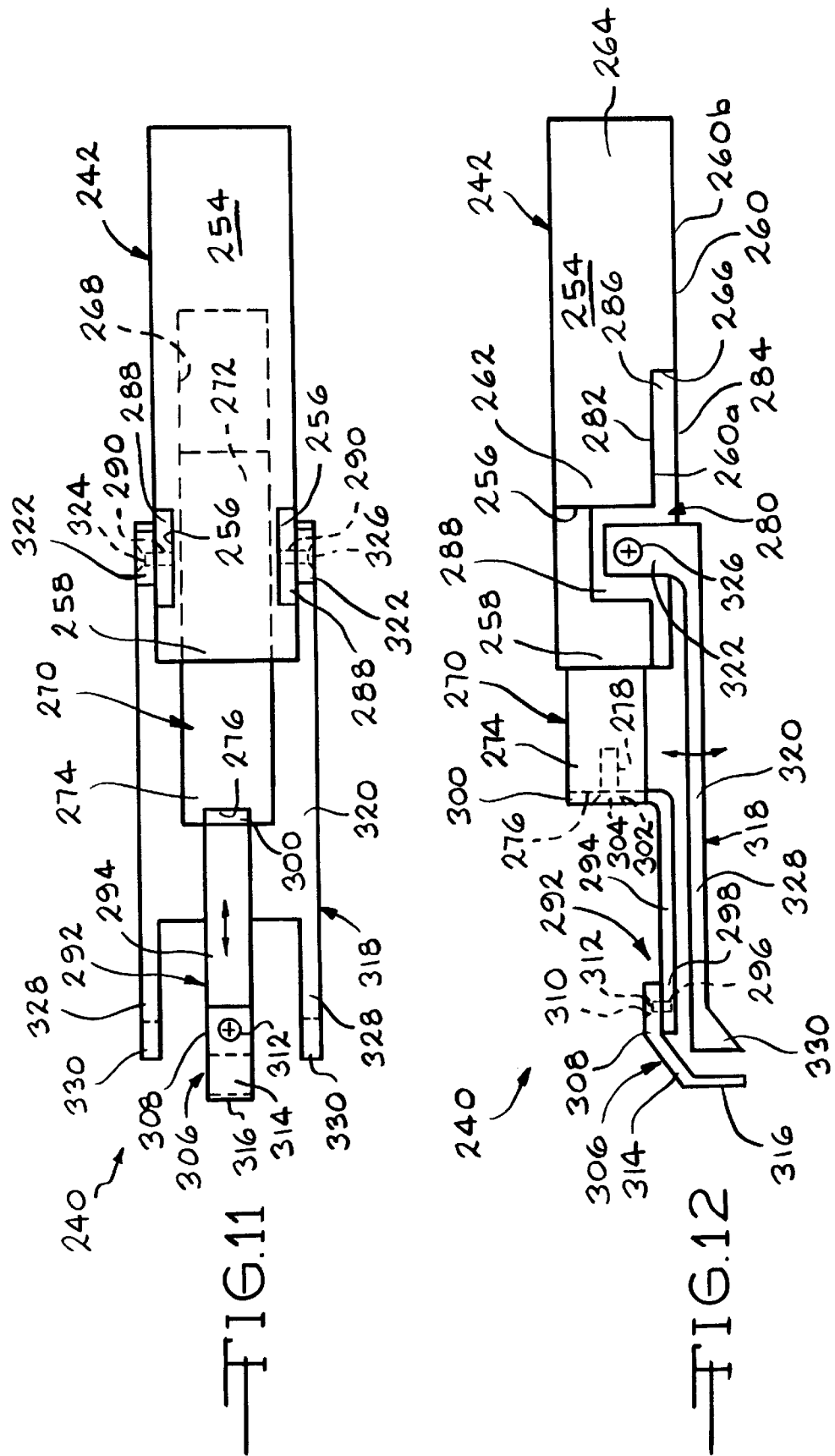

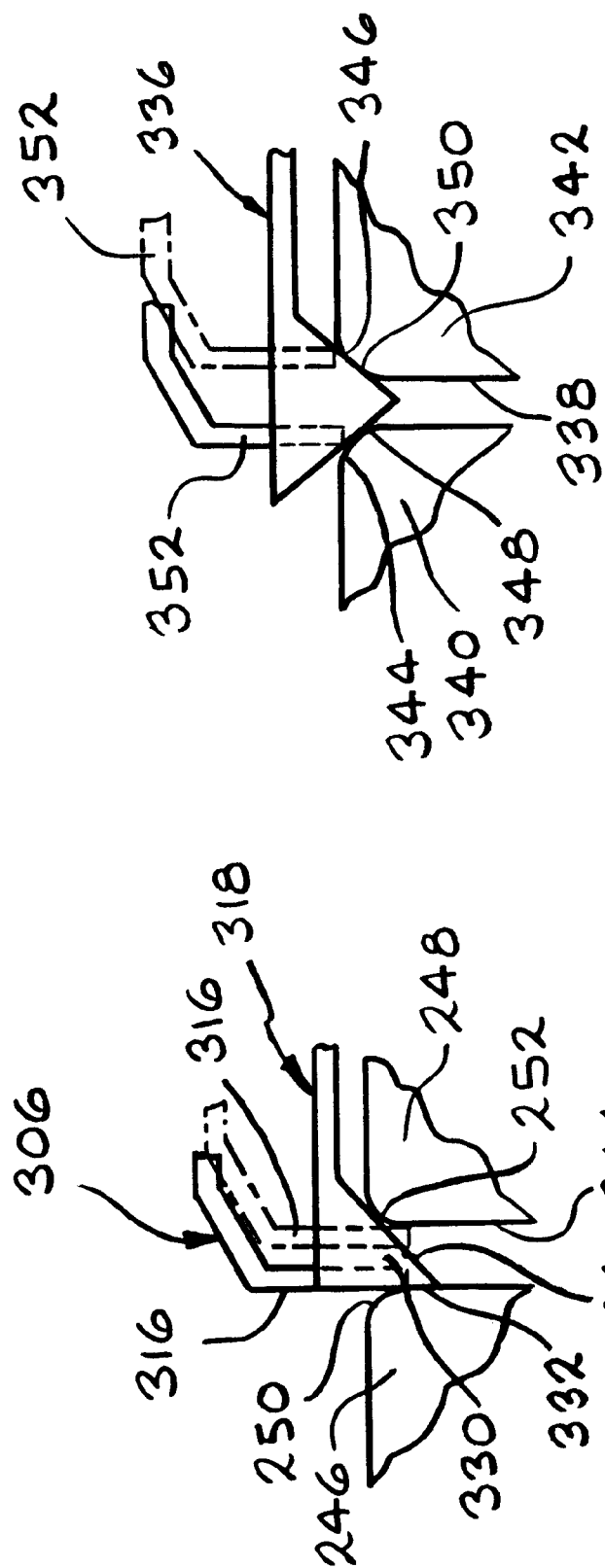

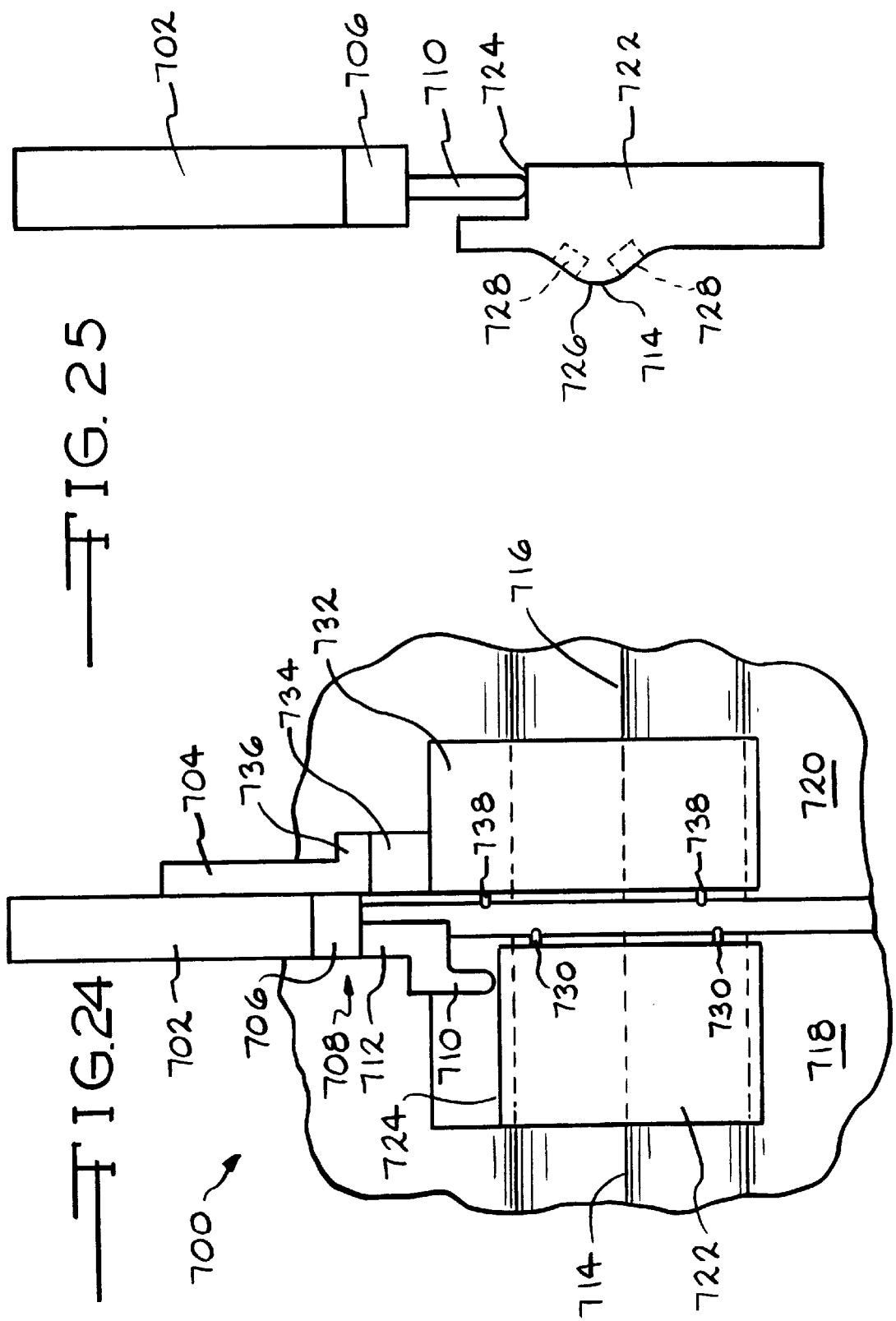

UNIVERSAL TRANSDUCER

This application claims benefit of Provisional Application Ser. No. 60/063,614, filed Oct. 27, 1997.

This invention relates in general to measuring instruments, and in particular to a hand-held measuring instrument including a transducer adapted for the snap-on attachment of different measuring elements.

In manufacturing operations, there is often a need to measure the gap or contour (flushness) between two adjacent parts in order to inspect the effect of previous manufacturing operations, or to insure the proper position of one part relative to another. For example, it may be desirable to check the installation of the hood on a vehicle by checking, at various locations, the gap between the hood and the adjacent fender of the vehicle. It may also be desirable to check that the hood and adjacent fender are flush with respect to one other. Gap and contour measurements may also be taken between any of the other adjacent panels used to form the body of a vehicle, such as side panels and quarter panels.

A variety of hand-held measuring instruments are available for taking gap and contour measurements, including simple instruments such as rulers, feeler gauges and calipers. Taking measurements with these instruments is often unreliable due to the difficulty in obtaining accurate, repeatable readings.

Various types of electronic hand-held measuring instruments are also available for taking gap and contour measurements. These instruments usually include a transducer and a measuring element such as a probe or pin for taking the measurements. A drawback of most current electronic measuring instruments is that the instrument is equipped with only a single type of measuring element. Consequently, the measuring instrument is limited in the types of measurements which can be taken. When it is desired to take a variety of different measurements, a number of different measuring instruments must be used which are suitable for taking those particular measurements. For example, multiple different transducers are needed when it is desired to take gap and contour measurements at all the different locations of a vehicle body. The use of a variety of different types of measuring instruments is relatively costly, time-consuming and inconvenient. Thus, it would be desirable to provide a hand-held measuring instrument providing increased flexibility in taking different types of measurements.

SUMMARY OF THE INVENTION

This invention relates to a quick-change attachment mechanism for a measurement assembly. The attachment mechanism includes a female part and a male part. The female part includes a female body having a pin hole formed therein, and an engagement piece disposed in the female body and urged into the pin hole. The male part includes a male body having a connection pin attached thereto, the connection pin including a recess defining a ramped connection surface. The connection pin of the male part is adapted to be inserted into the pin hole of the female part, with the engagement piece of the female part engaging the ramped connection surface of the connection pin to attach the male part to the female part. The engagement piece may be a spring loaded ball detent device, for example, engaging a notch formed on the connection pin to releasably couple the male part and the female part. One of the male part and the female part may be attached to a measuring instrument, with the other of the male part and the female part attached to a measuring tip, thereby allowing the measuring tip to be releasably mounted on the measuring instrument. The invention also relates to measuring instruments which may be adapted to various measuring jobs by selectively mounting various measuring tips and support bases adapted to a chosen measuring job utilizing a quick-change attachment mechanism.

BRIEF DESCRIPTION OF THE DRAWINGS

FIG. 4 is an end view of a female part of the measurement tip assembly of FIG. 3.

FIG. 5 is an enlarged perspective view of the female and male parts of the measurement tip assembly of FIG. 3, further illustrating the snap-on attachment mechanism.

FIG. 6 is an enlarged top view of a spring plunger engaging a connection pin of the snap-on attachment mechanism of FIG. 3.

FIG. 7 is a side view of a measurement finger and a reference finger of the measuring instrument of FIG. 1.

FIG. 8 is a front view of the measurement finger of FIG. 7.

FIG. 9 is a front view of the reference finger of FIG. 7.

FIG. 10 is a front view of the measurement finger and the reference finger of FIG. 7.

FIG. 11 is a top plan view of an alternate embodiment of a measuring instrument in accordance with the invention.

FIG. 12 is a side view of the measuring instrument of FIG. 11.

FIG. 13 is an enlarged side view of a measurement tip and a locator tip of the measuring instrument of FIG. 11.

FIG. 14 is an enlarged side view of a measurement tip and an alternate embodiment of a locator tip of the measuring instrument of FIG. 11.

FIG. 24 is front view of another alternate embodiment of a measuring instrument in accordance with the invention.

FIG. 25 is a side view, partially in cross section, of the measuring instrument of FIG. 24.

DETAILED DESCRIPTION OF THE PREFERRED EMBODIMENT

Figure 1:
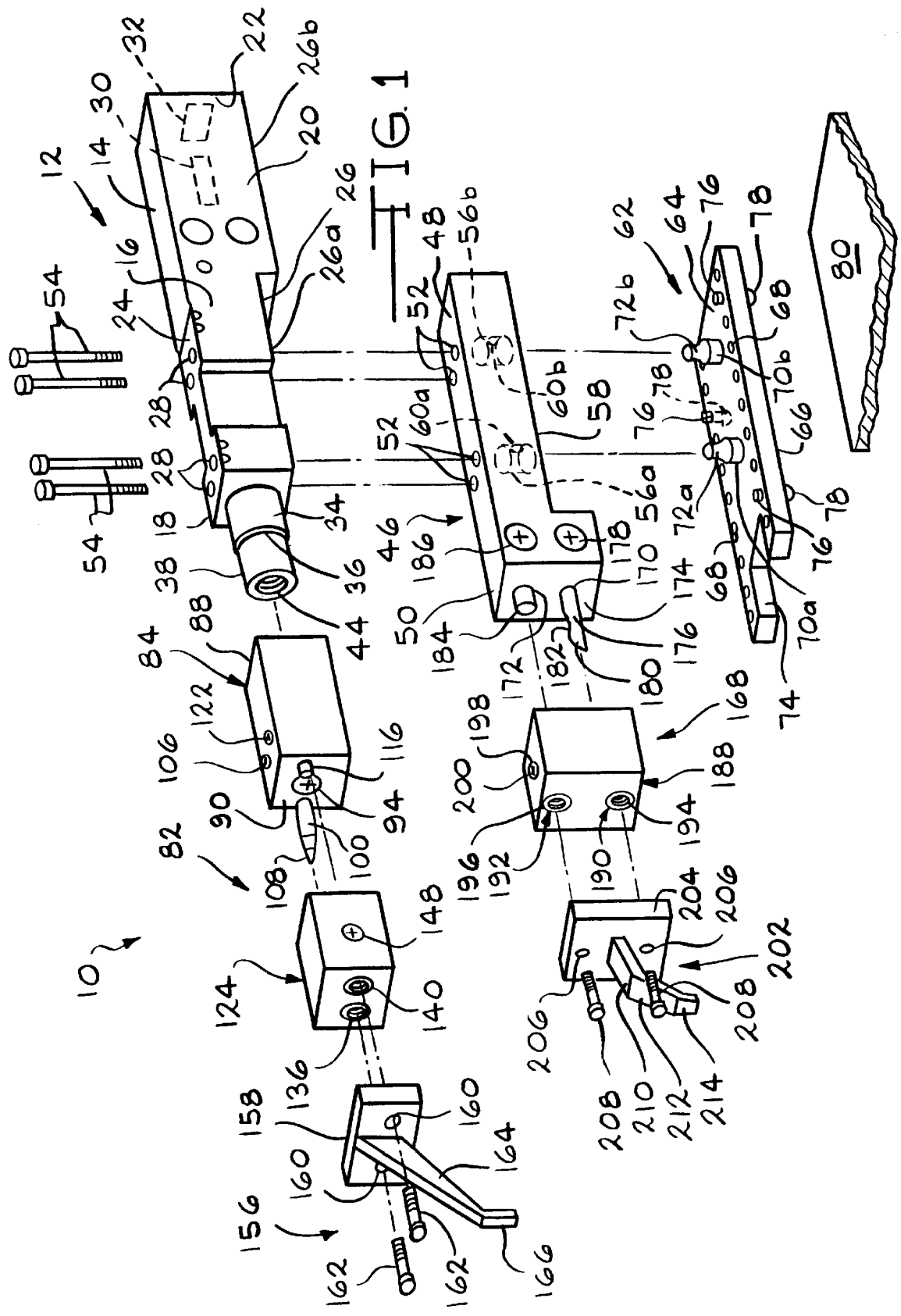
FIG. 1 is an exploded perspective view of a measuring instrument in accordance with the invention.

In the following description of the invention, certain terminology will be used for the purpose of reference only, and is not intended to be limiting for the orientation in which the invention is claimed. Terms such as "upper", "lower", "front", and "rear" refer to directions in the drawings to which reference is made. The term "longitudinal" refers to directions generally parallel to the lengthwise axis which may be defined by the main portion of the invention. Similarly, the term "transverse" refers to directions generally perpendicular to the lengthwise axis which may be defined by the main portion of the invention. Such terminology will include the words specifically mentioned above, derivatives thereof, and words of similar import.

Figure 2:
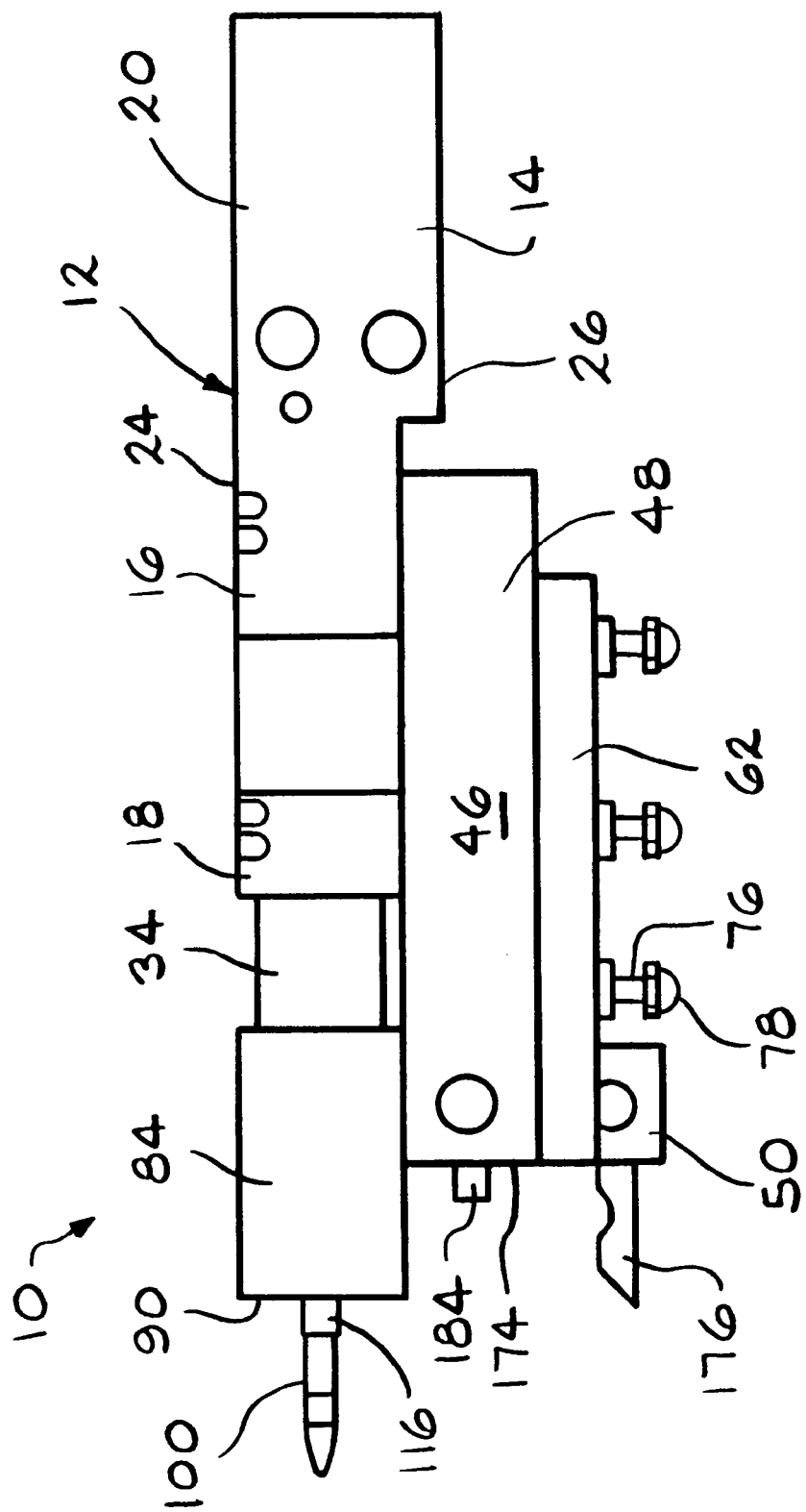
FIG. 2 is a side view of a portion of the measuring instrument of FIG. 1.
Figure 3:
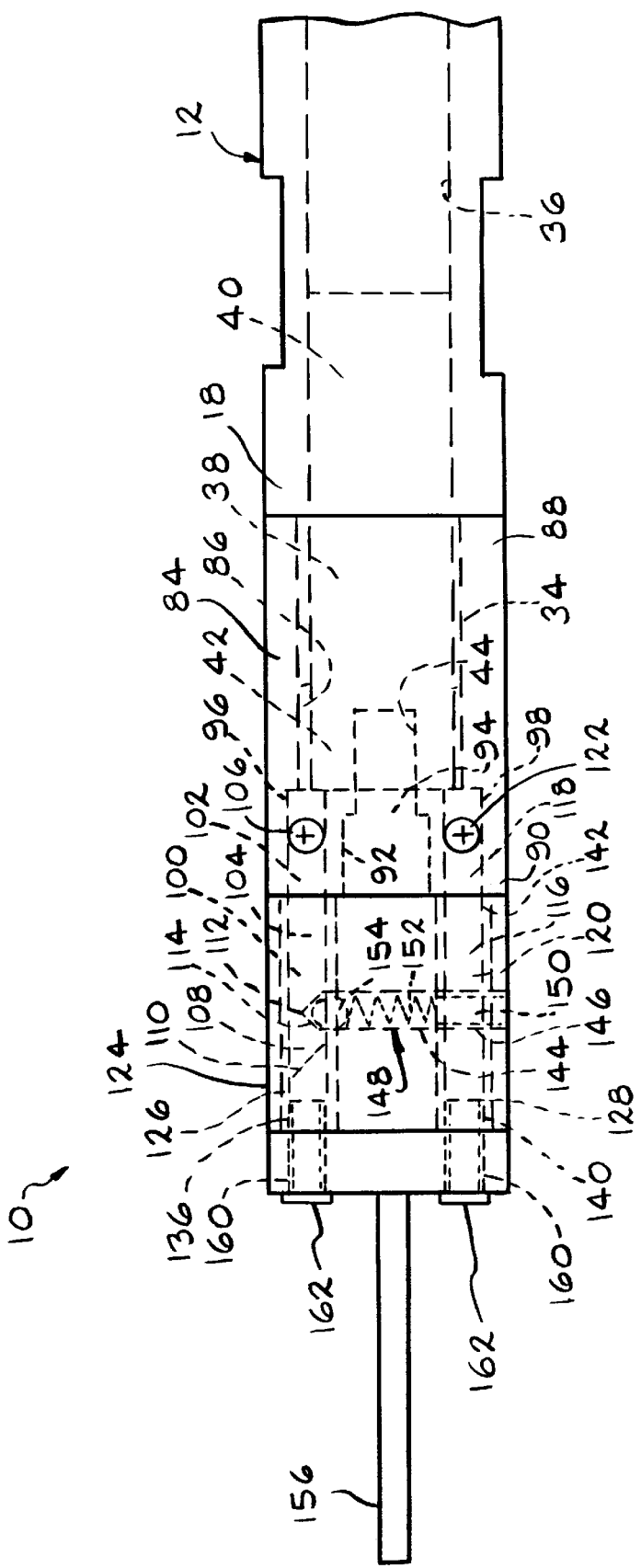
FIG. 3 is a top plan view of a portion of the measuring instrument of FIG. 1, illustrating a snap-on attachment mechanism for attaching a measurement tip assembly.

Referring to the drawings, FIGS. 1–3 illustrate a measuring instrument 10 including a universal transducer 12 in accordance with the invention. The universal transducer 12 can be any device which is capable of generating an electrical signal that is representative of the linear motion of a measuring element attached to the transducer 12. The universal transducer 12 includes a transducer housing or body 14 which is preferably formed from a lightweight metallic material such as aluminum alloy. The transducer body 14 is generally rectangular in shape and is elongated in a longitudinal direction. The transducer body 14 includes a front portion 16 having a front end 18 and a rear portion 20 having a rear end 22. The transducer body 14 further includes an upper surface 24 and a lower surface 26. The lower surface 26 of the transducer body 14 includes a lower surface 26a of the front portion 16, and a lower surface 26b of the rear portion 20. The lower surface 26a is recessed from the lower surface 26b. Two longitudinally spaced apart pairs of transversely spaced apart smooth bores 28 are formed through the front portion 16 of the transducer body 14 between the upper surface 24 and the lower surface 26.

An electronic transducer 30 and appropriate electrical connectors (not shown) are disposed inside the transducer body 14. A jack 32 is mounted in the rear end 22 of the transducer body 14. The jack 32 is adapted for receiving a plug of a cord (not shown) for electrically connecting the universal transducer 12 to an associated computer.

A cylindrical portion 34 is formed on the transducer body 14 and extends longitudinally from the front end 18. A longitudinally extending cylindrical bore 36 is formed through the cylindrical portion 34 and extends into the transducer body 14. A cylindrical probe shaft 38 has a rear end 40 slidably disposed inside the bore 36. The front end 42 of the probe shaft 38 extends forward from the transducer body 14. The probe shaft 38 is adapted to slide forward a predetermined distance to allow an attached measuring tip assembly (described below) to be moved through a predetermined amount of linear travel. The probe shaft 38 may be moved by any motive force, including, but not limited to, springs, motors, solenoids, pneumatic operators, and other suitable devices. The electronic transducer 30 monitors the movement of the probe shaft 38 to generate an electrical signal representative of the relative position of the probe shaft 38 and the transducer body 14. A threaded bore 44 is formed in the front end 42 of the probe shaft 38 for attachment of the measuring tip assembly (described below).

A strongback 46 is attached to the universal transducer 12 to provide support and to facilitate the attachment of a reference tip assembly (described below). Preferably, the strongback 46 is formed from a lightweight metallic material such as an aluminum alloy. The strongback 46 includes an attachment portion 48 which is generally rectangular in shape and is elongated in the longitudinal direction. The attachment portion 48 is sized for attachment to the recessed lower surface 26a of the front portion 16 of the transducer body 14, and it extends forward from the transducer body 14 a short distance. The width of the attachment portion 48 is approximately the same as the width of the front portion 16 of the transducer body 14. The strongback 46 also includes a male portion 50 at the front end of the attachment portion 48 and extending downward therefrom a short distance. The male portion 50 of the strongback 46 will be described in more detail below. Two longitudinally spaced apart pairs of transversely spaced apart threaded apertures 52 are formed through the upper surface of the strongback 46. The apertures 52 in the strongback are aligned with the bores 28 through the transducer body 14. Four threaded fasteners 54 are inserted through the bores 28 and threaded into the apertures 52 to attach the strongback 46 to the transducer body 14.

A pair of detent holes in the form of cylindrical recesses 56a and 56b are formed in the lower surface 58 of the strongback 46. Preferably, the recesses 56a and 56b lie along the longitudinal axis of the strongback 46. The recesses 56a and 56b have respective spring loaded detent balls 60a and 60b positioned therein, and cooperate to form a coupling structure with a quick release pad 62, as described below.

The strongback 46 and universal transducer 12 can be mounted on the quick release pad 62. Preferably, the quick release pad 62 is formed as a flat rectangular plate having opposed upper and lower faces, 64 and 66. A plurality of holes 68 extend through the pad 62, spaced a short distance inwardly from each longitudinally extending edge of the pad 62. A pair of spaced apart detent pins 70a and 70b extend perpendicularly to the upper face 64 from a central region of the upper face 64. The detent pins 70a and 70b define respective circumferential grooves 72a and 72b thereon. The detent pins 70a and 70b cooperate to form a coupling structure on the pad 62 which cooperates with the coupling structure formed on the strongback 46 to releasably attach the strongback 46 to the pad 62. More specifically, the quick release pad 62 may be attached to the strongback 46 by inserting the detent pins 70a and 70b into the cylindrical recesses 56a and 56b, respectively. The spring-loaded detent balls 60a and 60b in the cylindrical recesses 56a and 56b will engage the grooves 72a and 72b on the associated detent pins 70a and 70b to couple the quick release pad 62 and the strongback 46 with a spring-loaded snap fit. Preferably, the detent balls 60a and 60b are not fully seated in the associated grooves 72a and 72b when the quick release pad 62 is snug against the strongback 46, so that as the springs of the detent balls 60a and 60b try to urge the detent balls into the grooves 72a and 72b, the detent balls 60a and 60b draw the pad 62 snugly against the strongback 46. The pad 62 has a rectangular recess 74 in the front end to accommodate the downward extension of the male portion 50 of the strongback 46.

A plurality (preferably three) of adjustable posts 76 are inserted through selected ones of the holes 68 in the pad 62. In one embodiment, the holes 68 are threaded and each post 76 is a threaded bolt threaded into a hole 68. The lower ends of the posts 76 extending out of the pad 62 are threaded into removable tips 78. The tips 78 can be, for example, acorn nuts. The downward extension of each of the posts 76 relative to the pad 62 can be adjusted by selectively turning the post 76 to cause more or less of the post 76 to extend out of the lower face 66 of the pad 62, or alternatively, the length of the post 76 can be changed. Thus, the posts 76 can be adjusted to support the measuring instrument 10 in a desired orientation relative to a reference surface 80 on which the measuring instrument 10 is mounted. When three of the posts 76 are provided with two posts 76 along one longitudinal edge of the pad 62 and one post 76 along the other longitudinal edge of the pad 62, a single stable orientation is defined in which all three tips 78 of the posts 76 are resting on the reference surface 80, because the three tips 78, arranged in a triangle, define one and only one plane.

The measuring instrument 10 also includes a measuring tip assembly 82 is attached to the front end 42 of the probe shaft 38. As further described below, the measuring tip assembly 82 is adapted to measure a gap between two adjacent parts. The measuring tip assembly 82 includes a snap-on attachment mechanism so that different types of measuring tips can be quickly and easily connected to and released from the measuring instrument 10.

In particular, the measuring tip assembly 82 includes a male part 84 attached to the front end 42 of the probe shaft 38. The male part 84 is preferably generally rectangular in shape and elongated in the longitudinal direction. In one preferred embodiment, the height and width of the male part 84 are approximately the same as the height and width of the front portion 16 of the transducer body 14. Preferably, the male part 84 is formed from a block of a lightweight metallic material such as aluminum alloy.

As shown in FIG. 3, a cylindrical bore 86 is formed in the male part 84, extending from the rear end 88 of the male part 84 about two-thirds of the distance to the front end 90. A counterbore 92 extends from the front end 90 of the male part 84 to the bore 86. The male part 84 is attached to the probe shaft 38, with the front end 42 of the probe shaft 38 sliding into the bore 86 of the male part 84. A threaded fastener such as a cap head screw 94 extends through the counterbore 92 of the male part 84 and is threaded into the threaded bore 44 in the front end 42 of the probe shaft 38, to attach the male part 84 to the probe shaft 38.

Longitudinally extending first and second pin holes 96 and 98 are formed in the front end 90 of the male part 84. The first and second pin holes 96 and 98 are slightly spaced apart and are centered vertically in the front end 90. A relatively long, cylindrical connection pin 100 has a rear end 102 disposed in the first pin hole 96, and a front end 104 extending forwardly from the male part 84. The connection pin 100 is secured in place by a fastener 106 such as a set screw. The connection pin 100 has an angled point 108 which defines a ramped engagement surface 110. A recess 112 is disposed adjacent to the point 108. The front portion of the recess 112 defines a ramped connection surface 114 adjacent to the ramped engagement surface 110 of the point 108.

A relatively short, cylindrical alignment pin 116 has a rear end 118 disposed in the second pin hole 98, and a front end 120 extending forward a short distance from the male part 84. The alignment pin 116 is secured in place by a fastener 122. The connection pin 100 and the alignment pin 116 cooperate to form the male portion of the snap-on attachment mechanism.

The measuring tip assembly 82 also includes a female part 124. Preferably, the female part 124 is generally rectangular in shape. In a preferred embodiment, the height and width of the female part 124 are approximately the same as the height and width of the male part 84, but the female part 124 is shorter than the male part 84 in the longitudinal direction. Preferably, the female part 124 is formed from a block of a lightweight metallic material such as aluminum alloy.

As shown in FIGS. 3 and 4, longitudinally extending, cylindrical first and second through bores 126 and 128 are formed through the female part 124. Longitudinally extending, cylindrical first and second inserts 130 and 132 are press fit inside the first and second bores 126 and 128. Preferably, the first and second inserts 130 and 132 are formed from a strong and relatively wear resistant metallic material such as stainless steel. A cylindrical first pin hole 134 is formed through the first insert 130. The first pin hole 134 is sized to receive the front end 104 of the connection pin 100 of the male part 84. The front end 136 of the first pin hole 134 is threaded. A second pin hole 138 is formed through the second insert 132. The front end 140 of the second pin hole 138 is threaded. The rear end 142 of the second pin hole 138 is slotted out so that the rear end 142 of the pin hole 138 is oval in cross section. The oval-shaped second pin hole 138 has a minor diameter which is only slightly larger than the diameter of the alignment pin 116 of the male part 84. However, the second pin hole 138 has a major diameter which is substantially larger than the diameter of the alignment pin 116. The second pin hole 138 is provided with the oval-shaped cross section so that the connection pin 100 and the alignment pin 116 of the male part 84 can be inserted into the first and second pin holes 134 and 138 of the female part 124 without requiring an exact alignment of the pins 100 and 116. This accommodates minor variations in the manufacture of the male and female parts 84 and 124, particularly in the spacing and alignment of the pins 100 and 116.

As shown in FIGS. 3 and 5, a transversely extending cross hole 144 is formed through a side of the female part 124. The cross hole 144 extends through the second pin hole 138 and intersects with the first pin hole 134. The cross hole 144 includes a threaded outer end 146. A spring plunger 148 is mounted in the cross hole 144. The spring plunger 148 includes a threaded outer end 150 which is threaded into the outer end 146 of the cross hole 144. The spring plunger 148 also includes a spring 152 and a detent ball 154 which is engaged by the spring 152. The spring 152 urges the detent ball 154 into the first pin hole 134. The spring plunger 148 and the first and second pin holes 134 and 138 form the female portion of the snap-on attachment mechanism.

The female part 124 is pressed onto the male part 84 to connect the parts 84 and 124 together with the snap-on attachment mechanism. The connection pin 100 and alignment pin 116 of the male part 84 are received inside the first and second pin holes 134 and 138, respectively, of the female part 124. When the connection pin 100 slides into the first pin hole 134, the angled point 108 of the connection pin 100 engages the detent ball 154 of the spring plunger 148. The spring-loaded detent ball 154 rides along the ramped engagement surface 110 of the point 108. When the connection pin 100 is completely inserted into the first pin hole 134, the spring-loaded detent ball 154 snaps into the recess 112 of the connection pin 100 adjacent to the point 108. The engagement of the recess 112 by the detent ball 154 provides a connection between the male part 84 and the female part 124. Preferably, the male and female parts 84 and 124 are constructed so that the detent ball 154 engages the ramped connection surface 114 of the recess 112 at a position between points A and B shown in FIG. 6, when the connection pin 100 is completely inserted into the first pin hole 134. In other words, preferably the detent ball 154 is not fully seated in the recess 112 when the female part 124 is snug against the male part 84. As the spring 152 of the spring plunger 148 tries to urge the detent ball 154 into the recess 112, the detent ball 154 tries to draw the connection pin 100 into the first pin hole 134 so that the female part 124 is drawn tightly against the male part 84.

Thus, the snap-on attachment mechanism provides a quick and easy connection between the female part 124 and the male part 84. The female part 124 can be just as quickly and easily released from the male part 84 by pulling the female part 124 away from the male part 84 so that the snap-on attachment mechanism disconnects. As further illustrated below, the snap-on attachment mechanism of the invention allows a single transducer 12 to be used to take a variety of different types of measurements simply by snapping on different adapters and measuring elements. For example, an entire vehicle body can be measured by snapping different measuring tips, reference tips, adapters, mounts, strongbacks, etc., onto the transducer 12 by the use of the snap-on attachment mechanism.

As seen most clearly in FIGS. 7, 8 and 10, the measuring tip assembly 88 also includes a measurement finger 156. The measurement finger 156 includes a rectangular base 158 having a pair of apertures 160 formed therethrough. A pair of threaded fasteners 162 are inserted through the apertures 160 of the base 158, and threaded into the threaded front ends 136 and 140 of the first and second pin holes 134, 138 in the female part 124, to attach the measurement finger 156 to the female part 124. The measurement finger 156 includes a central finger portion 164 extending downward at an angle from the base 158, and a measurement tip 166 extending downward from the end of the finger portion 164. The purpose of the measurement tip 166 will be described below.

The measuring instrument 10 also includes a reference tip assembly 168. As described further below, the reference tip assembly 168 is adapted to set the position of the measuring instrument 10 relative to a gap to be measured. The reference tip assembly 168 includes a snap-on attachment mechanism so that different types of reference tips can be quickly and easily connected to and released from the measuring instrument 10. The snap-on attachment mechanism of the reference tip assembly 168 is substantially the same as the snap-on attachment mechanism of the measuring tip assembly 82, as will be explained below.

The reference tip assembly 168 includes the male portion 50 of the strongback 46. Longitudinally extending first and second pin holes 170 and 172 are formed in the front end 174 of the male portion 50. The first and second pin holes 170 and 172 are aligned vertically in the front end 174. A connection pin 176 is secured in the first pin hole 170 by a fastener 178. The connection pin 176 includes an angled point 180 and a recess 182 disposed adjacent to the point. An alignment pin 184 is secured in the second pin hole 172 by a fastener 186.

The reference tip assembly 168 also includes a female part 188 that is generally similar to the female part 124 described above. Preferably, the female part 188 is generally rectangular in shape. In a preferred embodiment, the height and width of the female part 188 are approximately the same as the height and width of the male portion 50 of the strongback 46. Longitudinally extending first and second pin holes 190 and 192 are formed through the female part 188. The front end 194 and 196, respectively, of the first and second pin hole 206 and 208 is threaded. The rear end (not shown) of the second pin hole 192 is slotted out so that the rear end of the pin hole 192 is oval in cross section. A vertically extending cross hole 198 is formed through upper surface of the female part 188. The cross hole 198 extends through the second pin hole 192 and intersects with the first pin hole 190. A spring plunger 200 is mounted in the cross hole 198. The spring plunger 200 includes a spring loaded detent ball (not shown) which is urged into the first pin hole 190.

The female part 188 is pressed onto the male portion 50 of the strongback 46 to connect the female part 188 and the male portion 50 with the snap-on attachment mechanism. The connection pin 176 and alignment pin 184 of the male portion 50 are received inside the first and second pin holes 190 and 192, respectively, of the female part 188. The detent ball (not shown) of the spring plunger 200 engages the recess 182 of the connection pin 176 to provide a connection between the male portion 50 and the female part 188.

The reference tip assembly 168 also includes a reference finger 202, as seen most clearly in FIGS. 7, 9 and 10. The reference finger 202 includes a rectangular base 204 having a pair of apertures 206 formed therethrough. A pair of threaded fasteners 208 are inserted through the apertures 206 of the base 204, and threaded into the threaded front ends 194 and 196 of the first and second pin holes 190 and 192 in the female part 188, to attach the reference finger 202 to the female part 188. The reference finger 202 includes an inner portion 210 extending horizontally from the base 204 in the longitudinal direction, a finger portion 212 extending downward at an angle from the inner portion 210, and a reference tip 214 extending downward from the end of the finger portion 212.

As shown in FIG. 7, the measuring instrument 10 can be used to measure a gap 216 between a first part 218 and a second part 220. In the illustrated embodiment, the measurement finger 156 is offset from the reference finger 202 so that the measurement tip 166 and reference tip 214 are positioned side by side. The measurement tip 166 and the reference tip 214 are positioned at the same height and the same longitudinal position when the measurement tip 166 is at a zero position of the illustrated embodiment. To measure the gap 216, the measurement tip 166 and the reference tip 214 are inserted into the gap 216 and held against the edge of the first part 218. Then the probe shaft 38 (FIG. 1) is extended from the measuring instrument 10 so that the attached measurement tip 166 moves in the forward direction (to the left in FIG. 7). The extended measurement tip 166 (shown in phantom in FIG. 7) engages the edge of the second part 220. The electronic transducer 30 (FIG. 1) monitors the movement of the probe shaft 38 to generate an electrical signal representative of the distance of movement of the attached measurement tip 166 from a zero position. An associated computer (not shown) receives the signal from the transducer 30, and adds the distance of movement of the measurement tip 166 to the thickness of the measurement tip 166 to determine the width of the gap 216. The thickness of the measurement tip 166 is preferably entered into the computer as part of a calibration process.

While the measurement tip 166 and the reference tip 214 are positioned side by side in the zero position illustrated in FIG. 7, it is contemplated that other measurement tips or reference tips could be used such that the measurement tip and the reference tip are not side by side. For example, a second measurement tip could be provided which extends longitudinally five centimeters more than the measurement tip 214. Such a second measurement tip could be used to measure a gap five centimeters wider than could be measured if the measurement tip 166 was attached. Thus, this second measurement tip extends the range of gap widths which may be measured by the measuring instrument 10, together with the measurement tip 166.

FIGS. 11–14 illustrate an alternate embodiment of a measuring instrument 240 including a universal transducer 242 in accordance with the invention. The measuring instrument 240 is particularly adapted for taking measurements of a gap 244 between first and second parts 246 and 248 having rounded edges 250 and 252. The universal transducer 242 includes a transducer body 254. A pair of opposed alignment slots 256 are formed in the sides of the transducer body 254 a short distance from the front end 258 of the transducer body 254. The lower surface 260a of the front portion 262 of the transducer body 254 is recessed from the lower surface 260b of the rear portion 264, so that a transversely extending notch 266 is defined in the lower surface 260 between the front portion 262 and the rear portion 264. Two longitudinally spaced apart pairs of transversely spaced apart smooth bores (not shown), like those in the embodiment of FIG. 1, are formed through the front portion 262 of the transducer body 254 between the upper surface 259 and the lower surface 260.

A longitudinally extending cylindrical bore 268 is formed in the front portion 262 of the transducer body 254. A cylindrical probe shaft 270 has a rear end 272 slidably disposed inside the bore 268. The front end 274 of the probe shaft 270 extends forward from the transducer body 254. The probe shaft 270 is spring-loaded so that it is adapted to extend longitudinally forward from the transducer body 254 by spring force. The extended probe shaft 270 can be retracted toward the transducer body 254 against the spring force. A vertically extending slot 276 is formed in the front end 274 of the probe shaft 270. A threaded bore 278 is also formed in the front end 274 of the probe shaft 270.

A strongback 280 is attached to the universal transducer 242. The strongback 280 is formed as a flat rectangular plate having opposed upper and lower faces 282 and 284, and elongated in the longitudinal direction. The strongback 280 is sized for attachment to the recessed lower surface 260a of the front portion 262 of the transducer body 254. The rear end 286 of the strongback 280 extends to the notch 266 formed in the lower surface 260 of the transducer body 254. The strongback 280 includes a pair of opposed arms 288 extending upward from the sides of the upper face 282 of the strongback 280. A threaded aperture 290 is formed in the outer surface of each of the arms 288. Two longitudinally spaced apart pairs of transversely spaced apart threaded apertures (not shown), similar to those in the embodiment of FIG. 1, are formed through the upper surface of the strongback 280. The apertures in the strongback are aligned with the bores through the transducer body.

The strongback 280 is attached to the transducer body 254 by sliding the arms 288 of the strongback 280 into the alignment slots 256 of the transducer body 254. Four threaded fasteners (not shown) are inserted through the bores (not shown) in the transducer body 254 and threaded into the apertures (not shown) in the strongback 280 to attach the strongback 280 to the transducer body 254. The arms 288 of the strongback 280 cooperate with the alignment slots 256 of the transducer body 254 to support the attachment of the strongback 280 on the transducer body 254.

The measuring instrument 240 also includes a measuring tip assembly 292 attached to the front end 274 of the probe shaft 270. The measuring tip assembly 292 includes a longitudinally extending measuring arm 294. The measuring arm 294 is formed as a flat, rectangular elongated piece. A threaded aperture 296 is formed through the front end 298 of the measuring arm 294. An upwardly extending flange 300 is formed on the rear end of the measuring arm 294. An aperture 302 is formed through the flange 300. To attach the measuring arm 294 to the probe shaft 270, the flange 300 of the measuring arm 294 is disposed in the slot 276 formed in the front end 274 of the probe shaft 270. Then a threaded fastener such as a cap head screw 304 is inserted through the aperture 302 in the flange 300 and threaded into the bore 278 in the front end 274 of the probe shaft 270.

The measuring tip assembly 292 also includes a measurement finger 306. The measurement finger 306 includes a horizontally extending inner portion 308 having an aperture 310 formed therethrough. A threaded fastener 312 is inserted through the aperture 310 and threaded into the threaded aperture in the front end 298 of the measuring arm 294, to attach the measurement finger 306 to the measuring arm 294. The measurement finger 306 also includes a central finger portion 314 extending downward at an angle from the inner portion 308, and a measurement tip 316 extending downward from the end of the finger portion 314.

The measuring instrument 240 also includes a gap locator 318 attached to the strongback 280. The gap locator 318 includes a gap locator body 320 which is formed as a flat rectangular plate and elongated in the longitudinal direction. A pair of flanges 322 extend upward from the rear end of the gap locator body 320, on opposing sides of the body 320. Each of the flanges 322 has an aperture 324 formed therethrough. Threaded fasteners 326 are inserted through the apertures 324 of the flanges 322 and threaded into the threaded apertures 290 in the arms 288 of the strongback 280, to attach the gap locator 318 to the strongback 280. The flanges 322 are attached to the strongback 280 in a manner which allows limited articulating movement of the gap locator 318 relative to the strongback 280 and transducer body 254, as shown by the arrow in FIG. 12.

A pair of locator arms 328 extend longitudinally forward from the front end of the gap locator body 320, on opposing sides of the body 320. A pair of locator tips 330 are formed on the front end of the locator arms 328. Each locator tip 330 is wedge-shaped and extends downward a short distance from the locator arm 328. In the embodiment shown in FIGS. 12 and 13, each locator tip 330 is formed as a triangle having a leading edge 332 extending downward perpendicular to the gap locator body 320, and a trailing edge 334 extending at an angle between the leading edge 332 and the gap locator body 320.

In operation, the strongback 280 and transducer body 254 are located in a reference position by inserting the locator tips 330 of the gap locator 318 into the gap 244. The gap locator 318 is pressed down so that both locator tips 330 are firmly wedged into the gap 244. The limited articulating movement of the gap locator 318 allows the locator tips 330 to be adjusted upward and downward relative to the transducer body 254 to accommodate different types of gaps. The leading edge 332 of each locator tip 330 contacts the edge 250 of the first part 246, and the trailing edge 334 of each locator tip 330 contacts the edge 252 of the second part 248.

Simultaneously, the measurement tip 316 is inserted into the gap 244. The measurement tip 316 attached to the spring-loaded probe shaft 270 is extended forward from the transducer body 254 (to the left in FIGS. 12 and 13) by spring force. The extended measurement tip 316 engages the edge 250 of the first part 246. An electronic transducer (not shown) inside the transducer body 254 generates an electrical signal representative of the extended position of the measurement tip 316. An associated computer (not shown) receives and records the signal from the transducer. The measurement tip 316 is then retracted (shown in phantom in FIG. 13) against the spring force until it engages the edge 252 of the second part 248. The transducer generates an electrical signal representative of the retracted position of the measurement tip 316, and the computer receives and records the signal. The computer determines the distance of movement of the measurement tip 316 from the two readings, and adds the thickness of the measurement tip 316 to determine the width of the gap 244.

FIG. 14 shows an alternate embodiment of a locator tip 336 which is particularly adapted for taking measurements of a gap 338 between first and second parts 340 and 342 having very rounded edges 344 and 346. The locator tip 336 is formed as a wedge or triangle having an angled leading edge 348 which engages the edge 344 of the first part 340, and an angled trailing edge 350 which engages the edge 346 of the second part 342. Various other sizes and shapes of locator tips can also be used in the invention. The measurement tip 352 is extended forward by spring force to engage the edge 344 of the first part 340 and take a reading. The measurement tip 352 is then retracted (shown in phantom in FIG. 14) against the spring force to engage the edge 346 of the second part 342 and take a reading.

Figure 15:
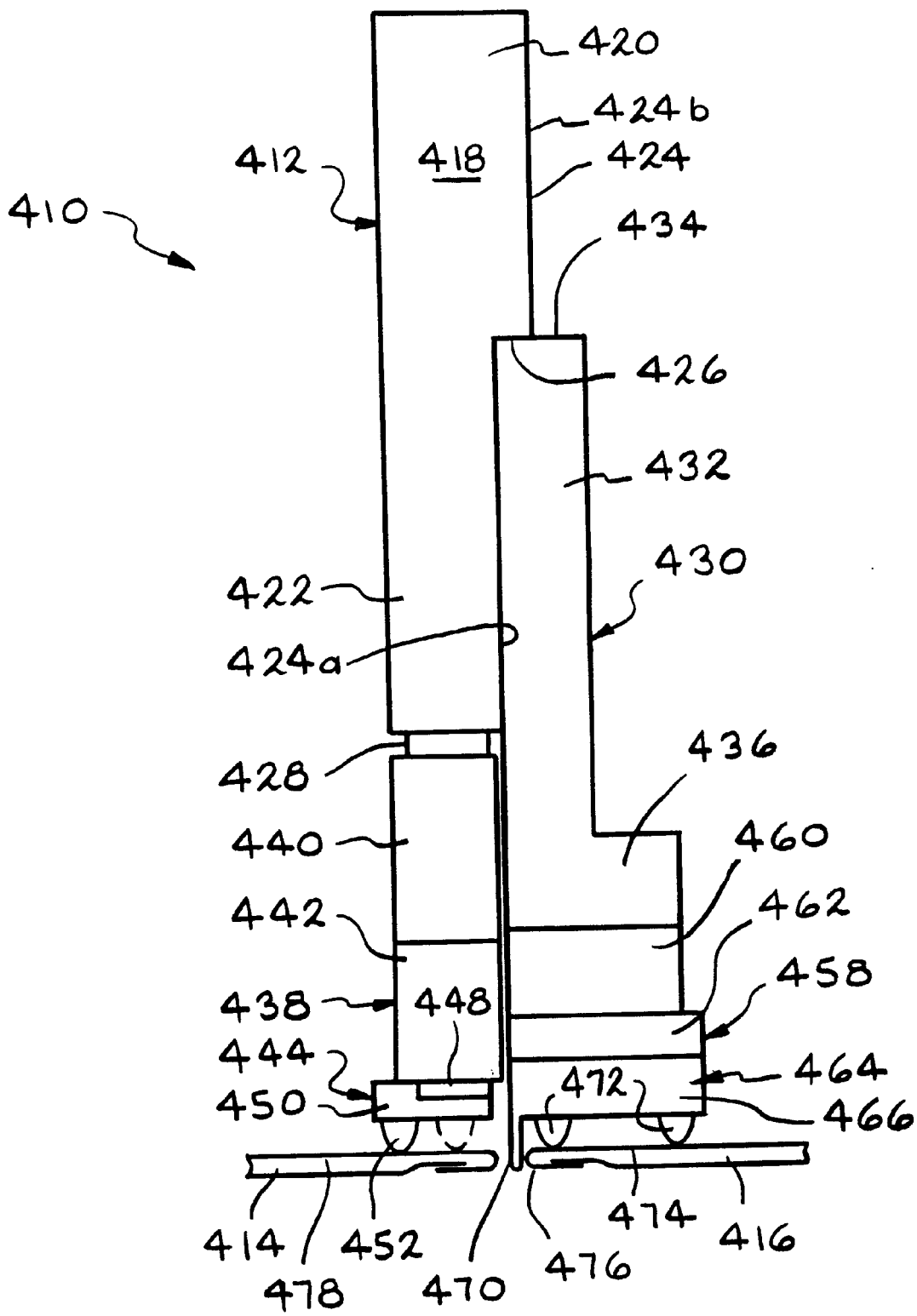
FIG. 15 is a side view of another alternate embodiment of a measuring instrument in accordance with the invention.
Figure 17:
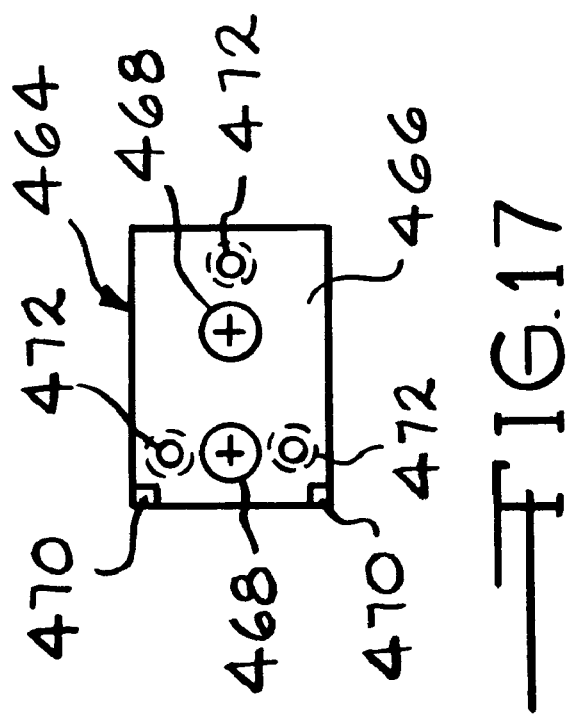
FIG. 17 is a bottom view of a reference tip of the measuring instrument of FIG. 15.
Figure 16:
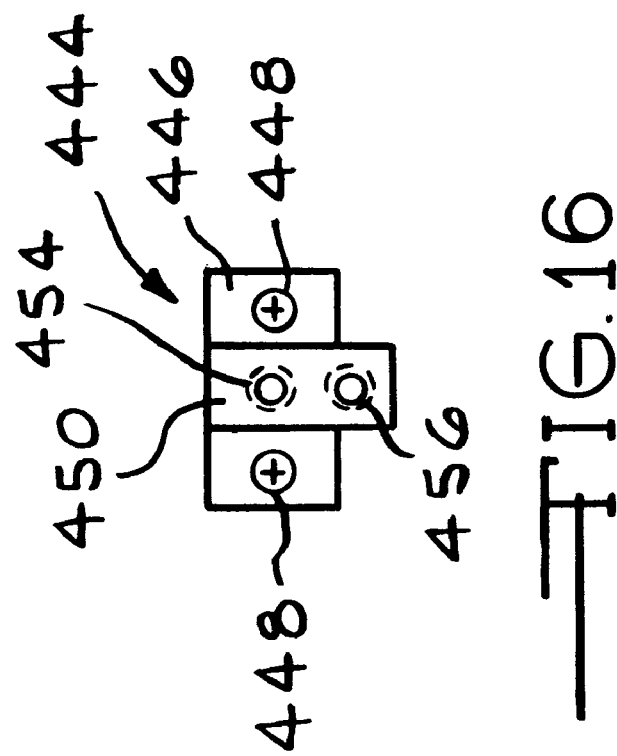
FIG. 16 is a bottom view of a measurement tip of the measuring instrument of FIG. 15.

FIGS. 15–17 illustrate another alternate embodiment of a measuring instrument 410 including a universal transducer 412 in accordance with the invention. The measuring instrument 410 is adapted for taking contour (flushness) measurements between a first part 414 and a second part 416. The measuring instrument 410 will not be described in detail, because it is similar in structure and operation to the measuring instrument 10 shown in FIG. 1 and described above. The universal transducer 412 includes a transducer body 418 having an upper portion 420 and a lower portion 422. The side surface 424a of the lower portion 422 is recessed from the side surface 424b of the upper portion 424, so that a transversely extending notch 426 is defined in the side surface 424 between the lower portion 422 and the upper portion 420. A probe shaft 428 is slidably disposed in the lower end of the transducer body 418.

A strongback 430 is attached to the transducer body 418. The strongback 430 includes an attachment portion 432 which is generally rectangular in shape and is elongated in the longitudinal direction. The attachment portion 432 is sized for attachment to the recessed side surface 424a of the lower portion 422 of the transducer body 418, and it extends downward from the transducer body 418 a short distance. The upper end 434 of the attachment portion 432 is supported by the notch 426. The strongback 430 also includes a male portion 436 at the lower end of the attachment portion 432 and extending to the side therefrom a short distance.

A measuring tip assembly 438 is attached to the lower end of the probe shaft 428. The measuring tip assembly 438 includes a male part 440 and a female part 442 which are adapted for connection by the snap-on attachment mechanism described above (shown in FIGS. 1 and 3). A measurement tip 444 is attached to the female part 442. The measurement tip 444 includes a flat, rectangular base 446 attached to the female part 442 by a pair of threaded fasteners 448. The measurement tip 444 also includes a transversely extending tip portion 450. A pad 452 such as an acorn nut on a post is threaded into either an inner threaded aperture 454 or an outer threaded aperture 456 in the lower surface of the tip portion 450, depending on the position of the edge of the first part 414 relative to the measuring instrument 410.

A reference tip assembly 458 is attached to the male portion 436 of the strongback 430. The reference tip assembly 458 includes a female part 460 which is adapted for connection with the male portion 436 by the snap-on attachment mechanism described above (shown in FIGS. 1 and 3). A spacer 462 is attached to the female part 460. A reference tip 464 is attached to the spacer 462. In an alternate embodiment (not shown), the reference tip is thicker in the longitudinal direction and is attached directly to the female part 460 without using the spacer 462. The reference tip 464 includes a generally rectangular base 466 attached to the spacer 462 by a pair of threaded fasteners 468. The reference tip 464 also includes a pair of pins 470 extending downward from the inner corners of the base 466. A plurality (preferably three) pads 472 such as acorn nuts on posts are threaded into the lower surface of the reference tip 464. The length of the pads 472 from the reference tip 464 can be adjusted. The three pads 472 provide a single stable orientation in which all three pads 472 are resting on a reference surface 474, because the three pads 472 define one and only one plane.

In operation, the pads 472 of the reference tip 464 are rested on the reference surface 474 of the second part 416. The pins 470 of the reference tip 464 are positioned against the edge 476 of the second part 416. Then the probe shaft 428 is extended from the transducer body 418 so that the pad 452 of the measurement tip 444 engages the upper surface 478 of the first part 414. The universal transducer 412 determines the flushness of the first part 414 relative to the second part 416.

Figure 18:
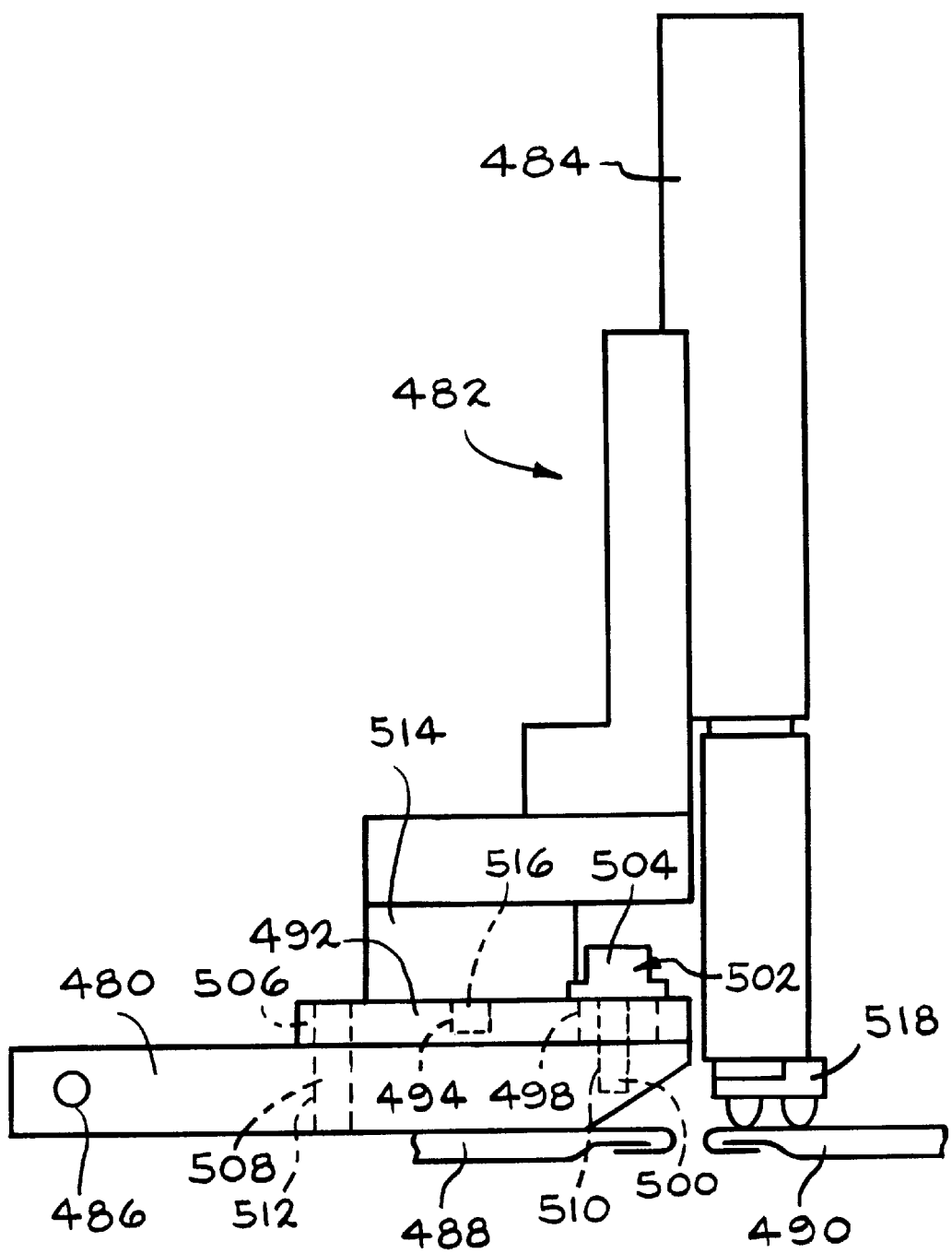
FIG. 18 is a side view of another alternate embodiment of a measuring instrument in accordance with the invention which is mounted on a swing template for locating the measuring instrument.
Figure 20:
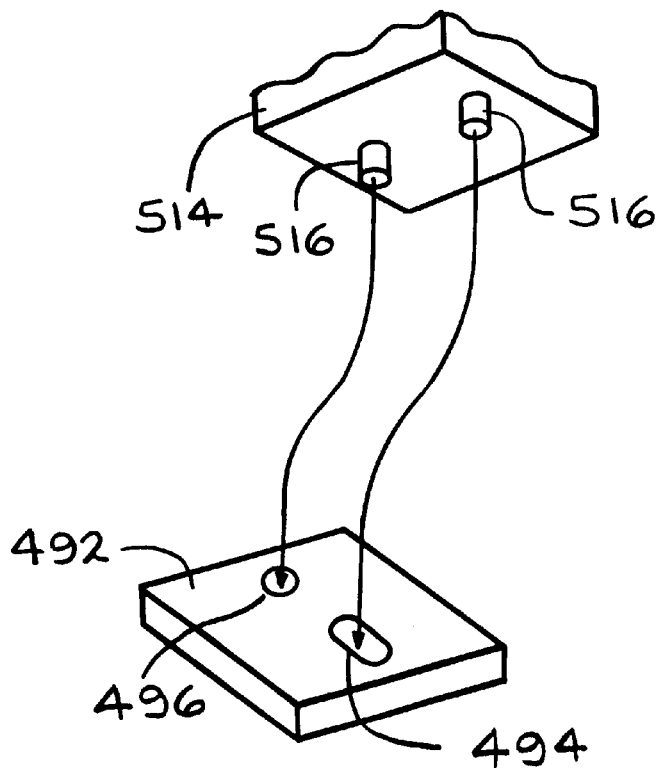
FIG. 20 is a perspective view of a reference tip of the measuring instrument being mounted in the locator plate of FIG. 19.
Figure 19:
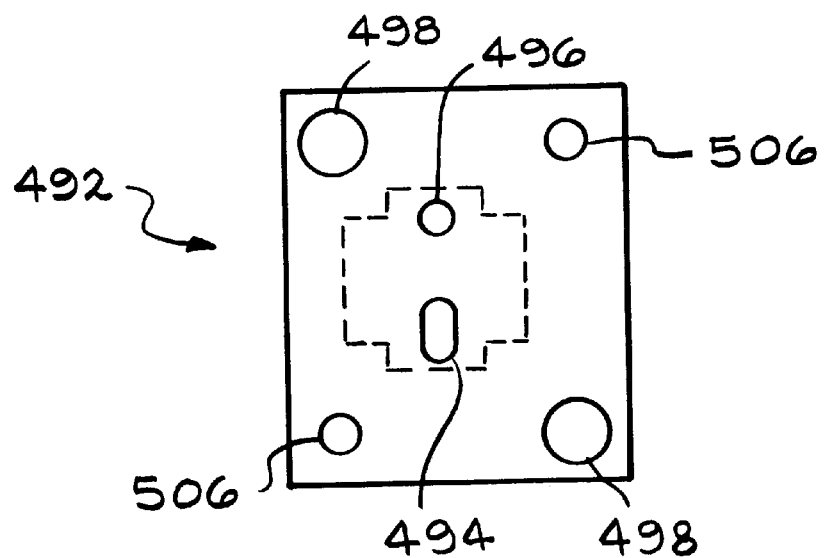
FIG. 19 is a top view of a locator plate adapted for attachment to the swing template of FIG. 18.

FIGS. 18–20 illustrate a swing template 480 for use in locating a measuring instrument 482 including a universal transducer 484 in accordance with the invention. The measuring instrument 482 is similar in structure and operation to the measuring instrument 410 illustrated in FIG. 15 and described above. The swing template 480 is pivotally connected at a joint 486 to a support (not shown) positioned at a desired location relative to first and second parts 488 and 490 to be measured for contour (flushness). The swing template 480 can be pivoted upward and out of the way when not in use, and pivoted downward for taking contour measurements with the measuring instrument 482.

A locator plate 492 is attached to the upper surface of the swing template 480 for locating the measuring instrument 482 at a precise position on the swing template 480. A slot 494 and a hole 496 are formed through the center portion of the locator plate 492. A pair of oversized bolt holes 498 are formed through opposing corners of the locator plate 492. The oversized bolt holes 498 are larger than the shank 500 of a pair of bolts 502 (one is shown) to be inserted through the bolt holes 498, but smaller than the head 504 of the bolts 502. A pair of smaller dowel holes 506 are formed through the other opposing corners of the locator plate 492. The dowel holes 506 are precision drilled to match the diameter of a pair of dowels 508 to be inserted through the dowel holes 506.

To attach the locator plate 492 at a precise location on the swing template 480, the locator plate 492 is positioned along a reference line (not shown) on the upper surface on the swing template 480. A pair of bolt holes 510 are formed in the swing template 480 below the oversized bolt holes 498 in the locator plate 492. The bolts 502 are inserted into the bolt holes 510 and softly tightened. The locator plate 492 is tapped into precise location. Then the bolts 502 are completely tightened. The location of the locator plate 492 is rechecked. Then a pair of dowel holes 512 are formed in the swing template 480 below the dowel holes 506 in the locator plate 492. The dowels 508 are then tightly positioned inside the dowel holes 506 and 512. The dowels 508 maintain the locator plate 492 at the precise location during use.

The measuring instrument 482 includes a reference tip 514. A pair of alignment pins 516 are formed on the lower surface of the reference tip 514. The reference tip 514 of the measuring instrument 482 is placed onto the locator plate 492, with the alignment pins 516 entering the slot 494 and hole 496 in the locator plate 492. The hole 496 has a diameter precisely sized to receive the first alignment pin 516. The slot 494 has a minor diameter precisely sized to receive the second alignment pin 516, and a major diameter which is larger than the second alignment pin 516. The slot 494 and hole 496 cooperate to precisely locate the measuring instrument 482, while the elongated slot 49 allows insertion of the alignment pins 516 without requiring an exact spacing and alignment of the pins 516. Once the measuring instrument 482 has been located, the measurement tip 518 of the measuring instrument 482 is extended to take a contour measurement.

Figure 21:
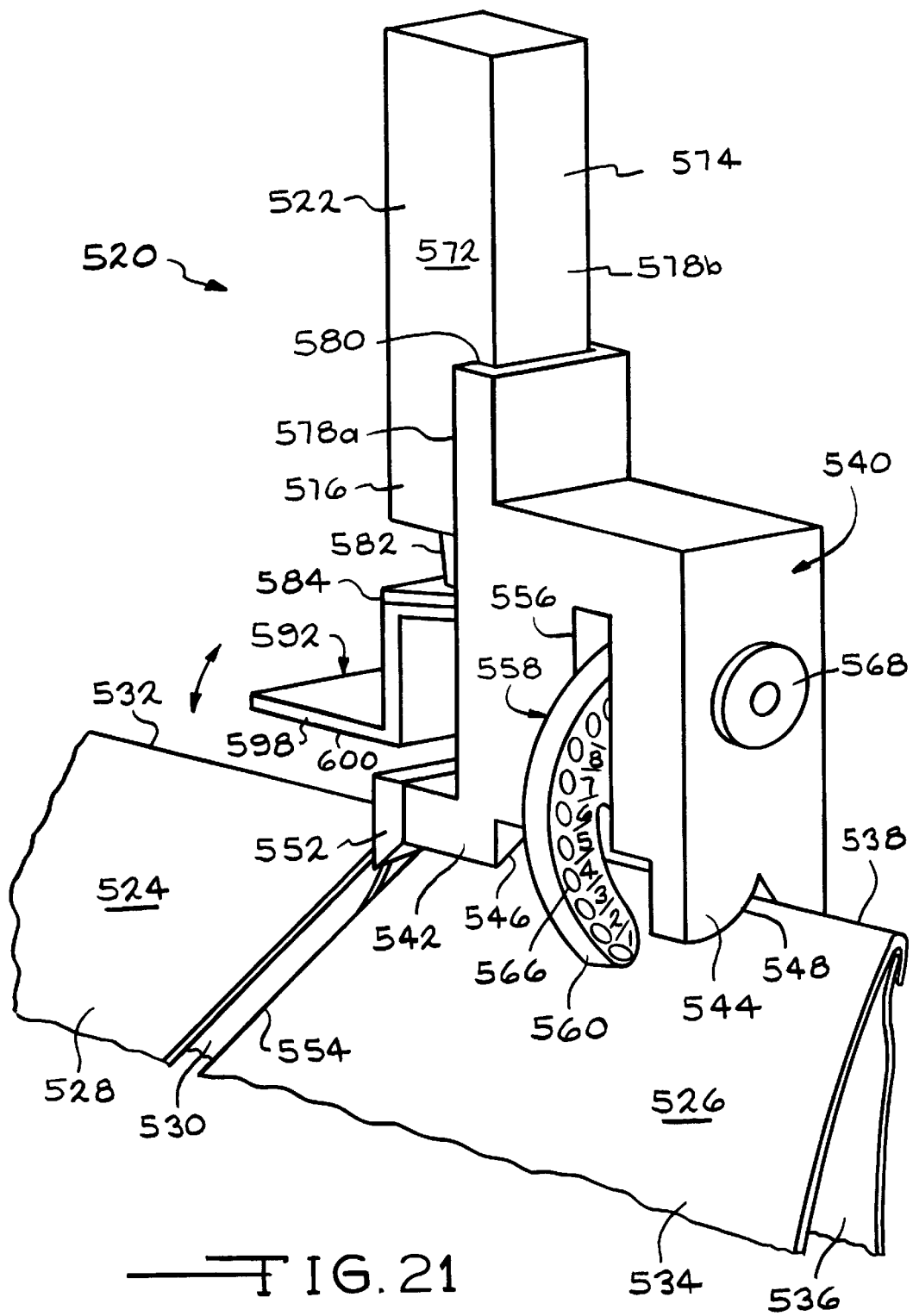
FIG. 21 is a perspective view of another alternate embodiment of a measuring instrument in accordance with the invention.
Figure 22:
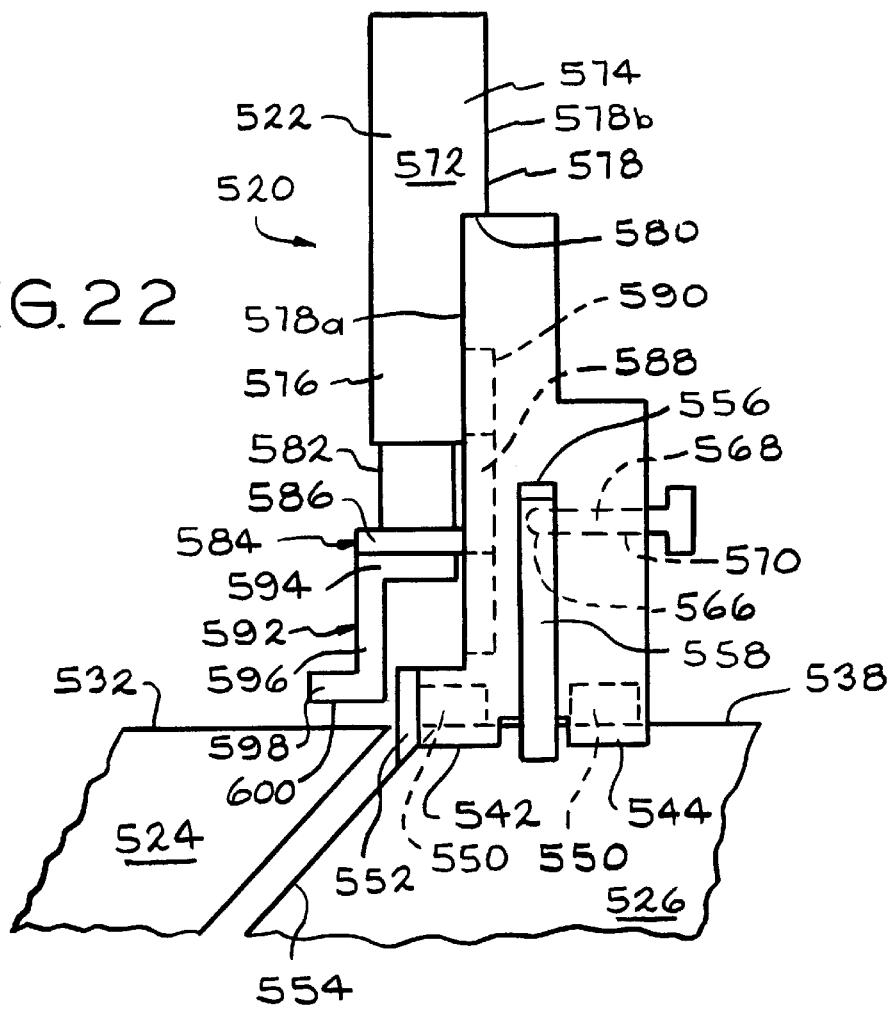
FIG. 22 is a side view of the measuring instrument of FIG. 21.
Figure 23:
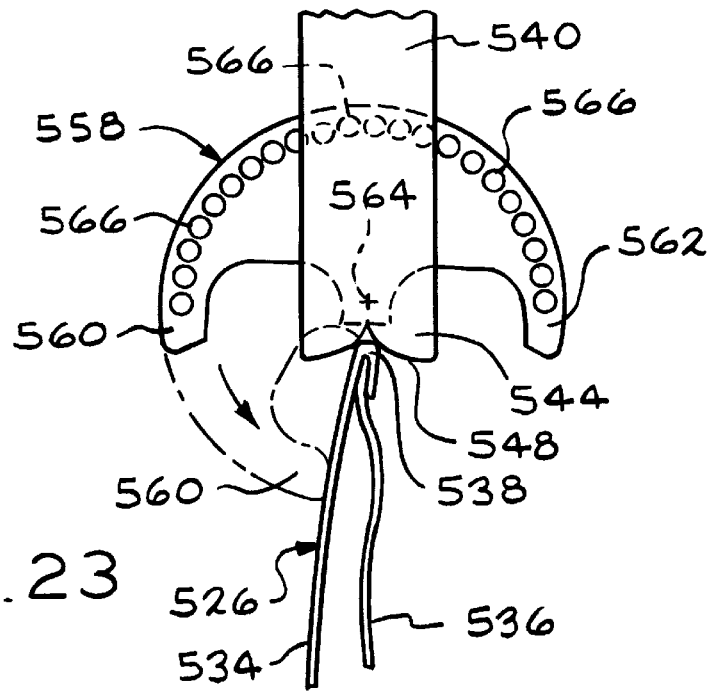
FIG. 23 is a rear view of a rotary stabilizer of the measuring instrument of FIG. 21.

FIGS. 21–23 illustrate another alternate embodiment of a measuring instrument 520 including a universal transducer 522 in accordance with the invention. The measuring instrument 520 is particularly adapted for taking contour measurements between first and second parts 524 and 526 which lack a horizontally-oriented surface for supporting the measuring instrument 520 while taking the measurements.

As shown in FIG. 21, the first and second parts 524 and 526, because of their structure and orientation, make the measurement of their contour difficult. The first part 524 has relatively large, opposing first and second sides 528 and 530. The sides 528 and 530 are joined at a relatively narrow edge 532 which extends around the perimeter of the first part 524. Similarly, the second part 526 has relatively large, opposing first and second sides 534 and 536. The sides 534 and 536 are joined at a relatively narrow edge 538 which extends around the perimeter of the second part 526.

The first and second parts 524 and 526 may be any of the adjacent panels used to form the body of a vehicle, such as side panels, quarter panels, hood, fenders, etc. In the illustrated embodiment, the first and second parts 524 and 526 are vertically oriented and attached to the vehicle frame (not shown) in a spaced apart fashion. Often, it is desirable that the edges 532 and 538 of the parts 524 and 526 are attached to the frame so as to have the same top contour. Since the edges 532 and 538 of the parts 524 and 526 may not provide a suitable horizontal surface for supporting a conventional contour measuring instrument, this embodiment of the invention contemplates providing a measuring instrument 520 which is adapted to be supported on a relatively narrow edge such as either of the edges 532 and 538.

The illustrated measuring instrument 520 includes a strongback 540 which is supported on the edge 538 of the second part 526. The strongback 540 includes front and rear stabilizer tips 542 and 544 in the lower end of the strongback 540. A pair of grooves 546 and 548 are formed in the lower surface of the stabilizer tips 542 and 544. The grooves 546 and 548 engage the edge 538 of the second part 526 to stabilize the measuring instrument 520 on the edge 538. A pair of magnets 550 are disposed inside the lower portion of the strongback 540 adjacent to the grooves 546 and 548 to hold the strongback 540 against the metallic edge 538. A wedge 552 is attached to the front stabilizer tip 542. The wedge 552 engages the angled front surface 554 of the second part 526 to position the measuring instrument 520 on the edge 538 in the fore and aft direction (along the length of the edge 538).

A vertically extending slot 556 is formed in the strongback 540, extending from the lower surface of the strongback 540 about three-quarters the distance to the upper surface of the strongback 540. The measuring instrument 520 includes a rotary stabilizer 558 which is mounted inside the slot 556. The rotary stabilizer 558 is formed as an arcuate plate having first and second ends 560 and 562. The rotary stabilizer 558 is rotatably connected at a joint 564 to the strongback 540. As shown in FIG. 23, the rotary stabilizer 558 can be rotated so that its first end 560 engages the first side 534 of the second part 526. Alternatively, the rotary stabilizer 558 can be rotated in the other direction (not shown) so that its second end 562 contacts the second side 536 of the second part 526. A plurality of numbered indexing recesses 566 are formed around the perimeter of the rotary stabilizer 558. A threaded pin 568 is threaded into a threaded bore 570 which is aligned with the numbered indexing recesses 566 of the rotary stabilizer 558. The rotary stabilizer 558 is rotated to a desired position so that the first end 560 of the rotary stabilizer 558 engages the first side 534 of the second part 526, and the measuring instrument 520 is in an upright position. Then the pin 568 is further threaded into the bore 570 so that the end of the pin 568 is inserted into the aligned numbered indexing recess 566 to lock the rotary stabilizer 558 in the desired position.

Thus, the measuring instrument 520 is set in a reference position on the edge 538 of the second part 526 relative to the edge 532 of the first part 524. As described above, the measuring instrument 520 engages the second part 526 at three points to provide a three-point plane for stability in taking measurements. In particular, the groove 546 of the front stabilizer tip 542 engages the edge 538 of the second part 526 at a first point, the groove 548 of the rear stabilizer tip 544 engages the edge 538 of the second part 526 at a second point, and the first end 560 of the rotary stabilizer 558 engages the first side 534 of the second part 526 at a third point. As described above, the wedge 552 engages the angled front surface 554 of the second part 526 to position the measuring instrument 520 on the edge 538 in the fore and aft direction (along the length of the edge 538). The three-point plane and the fore/aft positioning provide for repeatability of measurements taken by the measuring instrument 520.

The universal transducer 522 of the measuring instrument 520 is attached to the strongback 540. The universal transducer 522 includes a transducer body 572 having an upper portion 574 and a lower portion 576. The side surface 578a of the lower portion 576 is recessed from the side surface 578b of the upper portion 574, so that a transversely extending notch 580 is defined in the side surface 578 between the upper portion 574 and the lower portion 576. The front side of the strongback 540 is received in the recessed side surface 578a of the transducer body 522, and the upper end of the strongback 540 engages the notch 580 to provide stability to the transducer body 572. The transducer body 572 is secured to the strongback 540 by a threaded fastener (not shown).

A probe shaft 582 is slidably disposed in the lower end of the transducer body 572. A spacer 584 is attached to the lower end of the probe shaft 582. The spacer 584 includes a horizontally extending base portion 586 attached to the probe shaft 582, and a vertically extending flange portion 588. A longitudinally extending recess 590 is formed in the front side of the strongback 540. The flange portion 588 of the spacer 584 is slidably disposed in the recess 590. The recess 590 extends a predetermined longitudinal distance within the strongback 540 to allow the spacer 584 and an attached measuring element (described below) to be moved by the probe shaft 582 through a predetermined amount of longitudinal travel.

A measuring element 592 is attached to the lower surface of the spacer 584. The measuring element 592 includes a horizontally extending base portion 594 attached to the spacer 584, and a vertically extending leg portion 596 extending downward from the front edge of the base portion 594. A horizontally extending measurement tip 598 extends forward from the lower edge of the leg portion 596. The measurement tip 598 includes a lower surface 600 adapted to engage the edge 532 of the first part 524 for measuring the contour between the first and second parts 524 and 526.

FIGS. 24 and 25 illustrate another embodiment of a measuring instrument 700 in accordance with the invention. By way of background, a conventional measuring instrument usually includes a measurement tip or probe which contacts a part to be measured to take the desired measurement. However, some locations on a part do not have a suitable surface for contact by the measurement tip or probe. For example, the "feature lines" of a vehicle are horizontal grooves in the door and fender which should be aligned with one another for proper appearance. Unfortunately, these grooves do not have a suitable surface for contact by a measurement tip to take contour measurements. As another example, the front of a car where the hood and fender meet usually includes curved surfaces which are unsuitable for contact by a measurement tip.

The illustrated measuring instrument 700 overcomes this problem, thereby allowing measurements to be taken at difficult locations which could not previously be measured. The measuring instrument 700 includes a transducer 702 and a strongback 704 as previously described. A male portion 706 of a measurement tip assembly 708 is attached to the probe shaft (not shown) of the transducer 702. A measurement tip 710 including a female portion 712 is attached to the male portion 706 by the snap-on attachment mechanism previously described.

The measuring instrument 700 is located for taking a contour measurement of the feature lines 714 and 716 in the door 718 and fender 720 of a vehicle. Ordinarily, such a measurement is not possible because the grooved surfaces of the feature lines 714 and 716 lack a suitable surface for contact by the measurement tip 712. The measuring instrument 700 overcomes this problem by the use of a measurement reference base 722. The measurement reference base 722 includes a measurement surface or ledge 724 which is suitable for contact by the measurement tip 712 for taking a contour measurement. Thus, instead of contacting the feature line 714, the measurement tip 712 contacts a measurement ledge 724 of the measurement reference base 722 which is mounted on the feature line 714. A correlation is determined between the position of the measurement ledge 724 and the position of the feature line 714.

Preferably, the back surface 726 of the measurement reference base 722 is contoured so that it fits into the contour of the feature line 714. In other words, the measurement reference base 722 and the feature line 714 have complementary surfaces. The measurement reference base 722 is held in place by any suitable means such as magnets 728 mounted in the back surface 726, and hooks 730 mounted in the side which engage the edge of the door 718.

The measuring instrument 700 also includes a base reference base 732. The base reference base 732 includes a female portion 734 which is attached to a male portion 736 of the strongback 704 by the snap-on attachment mechanism. The base reference base 732 establishes a reference surface on the feature line 716 of the fender 720. Preferably, the back surface (not shown) of the base reference base 732 is contoured so that it fits into the contour of the feature line 716. The base reference base 722 is held in place by magnets (not shown) and hooks 738 or other suitable means.

The shapes of the measurement reference base 722 and the base reference base 732 can be varied depending on the shape of the part to be measured. While it is preferred that the measurement reference base 722 and the base reference base 732 have surfaces which are complementary to the part to be measured, this is not critical so long as the bases 722 and 732 are suitably mounted in position for taking measurements. Preferably, the measurement ledge 724 is a flat surface which is oriented at a desired angle relative to the part to be measured. For example, preferably the measurement ledge 724 is oriented perpendicular to a plane extending between the hinges of the vehicle door 718.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A support and attachment mechanism for a measurement assembly comprising:

a female part including a female body having a pin hole formed therein, and an engagement piece disposed in the female body and urged into the pin hole; and a male part including a male body having a connection pin attached thereto, the connection pin including a recess defining a ramped connection surface;

wherein the connection pin of the male part is adapted to be inserted into the pin hole of the female part, with the engagement piece of the female part engaging the ramped connection surface of the connection pin to attach the male part to the female part and while attached pull said male body against said female body.

2. The support and attachment mechanism defined in claim 1 wherein the engagement piece of the female part comprises a spring-loaded detent ball.

3. The support and attachment mechanism defined in claim 1 wherein the connection pin includes an angled point for engaging the engagement piece of the female part, and wherein the recess is disposed adjacent to the point.

4. The support and attachment mechanism defined in claim 1 wherein the engagement piece is not fully seated in the recess when the male part is attached to the female part.

5. The support and attachment mechanism defined in claim 1 further including a strongback attached to the measurement assembly, the strongback including first and second stabilizer portions adapted for engaging a part to be measured at first and second locations, and a rotary stabilizer rotatably attached to the strongback and including a third stabilizer portion adapted for engaging the part to be measured at a third location.

6. The support and attachment mechanism defined in claim 5 wherein the mechanism further includes a locking member adapted to lock the rotary stabilizer when it is rotated to a desired position.

7. The support and attachment mechanism defined in claim 5 wherein the rotary stabilizer is generally arcuate in shape and includes a first end adapted for engaging the part to be measured when the rotary stabilizer is rotated in a first direction, and a second end adapted for engaging the part to be measured when the rotary stabilizer is rotated in a second direction.

8. The support and attachment mechanism defined in claim 5 wherein the first and second stabilizer portions of the strongback include spaced apart first and second grooves.

9. The support and attachment mechanism defined in claim 5 wherein the mechanism further includes a flange for engaging the part to be measured at a fourth location.

10. The support and attachment mechanism defined in claim 9 wherein the flange is a wedge.

11. The support and attachment mechanism defined in claim 5 wherein the rotary stabilizer includes a plurality of indexing recesses, and wherein the locking member comprises a pin adapted for engaging one of the indexing recesses when the rotary stabilizer is rotated to a desired position.

12. The support and attachment mechanism defined in claim 1 further including a locator assembly for temporarily locating the measurement assembly on a reference surface in measuring relationship to a part to be measured, including a locator plate comprising a flat plate having first and second opposed pairs of attachment holes formed therethrough in a generally rectangular pattern, and having a first location hole and a slotted second location hole formed therethrough positioned between the attachment holes.

13. The support and attachment mechanism defined in claim 12 wherein the first pair of attachment holes has a larger diameter than the second pair of attachment holes.

14. The support and attachment mechanism defined in claim 12 wherein the locator plate is generally rectangular in shape and the first and second pairs of attachment holes are formed through the corners of the locator plate.

15. The support and attachment mechanism defined in claim 1 further including a locator assembly for temporarily locating the measurement assembly on a reference surface in measuring relationship to a part to be measured, comprising:

a pair of dowels;

a pair of fasteners having a head portion and a shank portion;

a locator plate comprising a flat plate having a pair of opposed dowel holes formed therethrough, the dowel holes having a diameter approximately the same as the diameter of the dowels, and the plate having a pair of opposed fastener holes formed therethrough, the fastener holes having a diameter larger than the diameter of the shank portion of the fasteners but smaller than the diameter of the head portion of the fasteners, the pairs of dowel holes and fastener holes being arranged in a generally rectangular pattern in the plate, and the plate having a first location hole and a slotted second location hole formed therethrough positioned between the dowel holes and fastener holes.

16. The support and attachment mechanism defined in claim 1 further including a gap locator for positioning the measurement assembly relative to a gap to be measured, the gap locator comprising:

a longitudinally extending gap locator body;

a pair of opposed flanges extending from a first end of the gap locator body, the flanges being adapted for attachment of the gap locator to the measuring instrument in a manner which allows articulating movement of the gap locator relative to the measuring instrument; and a pair of opposed locator tips extending from a second end of the gap locator body in a direction opposite the direction of the flanges.

17. The support and attachment mechanism defined in claim 16 wherein the locator tips are wedge-shaped.

18. The support and attachment mechanism defined in claim 1, further including a measurement base adapted to be mounted at a known position relative to a surface, the measurement base including a measurement ledge adapted to be contacted by a measurement tip of the measurement assembly for taking a measurement.

19. The support and attachment mechanism defined in claim 18 wherein the measurement base includes a surface which is complementary with the surface to be measured.

20. The support and attachment mechanism defined in claim 18 further including a reference base adapted for mounting the measuring instrument at a reference position relative to the surface to be measured.

21. A support and attachment mechanism for a measurement assembly comprising:

a female part including a female body having a pin hole formed therein, and an engagement piece disposed in the female body and urged into the pin hole; and a male part including a male body having a connection pin attached thereto, the connection pin including a recess defining a ramped connection surface;

wherein the connection pin of the male part is adapted to be inserted into the pin hole of the female part, with the engagement piece of the female part engaging the ramped connection surface of the connection pin to attach the male part to the female part wherein the female part has a second pin hole formed therein and the male part has a fixed alignment pin attached thereto, the alignment pin being adapted to be inserted into the second pin hole when the male part is attached to the female part to prevent relative rotation of said male and female parts about an axis of said connection pin.

* * * * *